United States Patent
Apelberg et al.

[19]

[11] Patent Number: 5,861,613
[45] Date of Patent: Jan. 19, 1999

[54] CIRCULAR BAR CODE DATA ANALYSIS METHOD

[75] Inventors: Jacob Apelberg, Baltimore, Md.; Klaus W. Berndt, Stewartstown, Pa.

[73] Assignee: Becton Dickinson and Company, Franklin Lakes, N.J.

[21] Appl. No.: 947,066

[22] Filed: Oct. 8, 1997

Related U.S. Application Data

[63] Continuation of Ser. No. 736,882, Oct. 25, 1996, abandoned.
[51] Int. Cl.$^6$ ..................................................... G06K 7/10
[52] U.S. Cl. .......................................... 235/464; 235/462
[58] Field of Search ................................... 235/464, 472, 235/462, 454, 463

[56] References Cited

U.S. PATENT DOCUMENTS

| | | | |
|---|---|---|---|
| 3,585,366 | 6/1971 | Kern | 235/463 |
| 3,643,068 | 2/1972 | Mohan | 235/464 |
| 3,752,961 | 8/1973 | Torrey | 235/437 |
| 4,000,397 | 12/1976 | Hebert | 235/462 |
| 4,308,455 | 12/1981 | Bullis | 235/463 |

*Primary Examiner*—Donald T. Hajec
*Assistant Examiner*—Karl Frech
*Attorney, Agent, or Firm*—Alan W. Fiedler

[57] ABSTRACT

A system evaluates the data derived from scanning a circular bar code element. The elements in the circular bar code extend radially outwardly from a center of the label, and their width varies along the radial direction. For that reason, should a circular bar code reader be offset relative to the center of the label, it is possible that the circular bar code reader would develop analog signals of the width of elements that vary within a single scan. At one location on the label, an offset reader may read one analog signal for a wide element, and at another location may read a wholly different signal for a wide element with an identical width. To address this problem, an element under evaluation is compared to adjacent elements, and a determination is made of whether the particular element is wide or narrow. Any offset will cause minimal variation in adjacent elements. Several methods for using this basic concept are disclosed. The invention also provides an improved method of switching between digital signals indicating dark or light elements. The analog signal is separated into two branches with a first branch being directed into a delay. The second branch identifies a peak value for the particular element, and then develops a signal proportional to that peak value. The delayed signal is then compared to that proportional signal, and when the delayed signal crosses that proportional signal, the digital signal is switched between the dark and light readings.

8 Claims, 6 Drawing Sheets

CIRCULAR BAR CODE DATA ANALYSIS METHOD

This application is a continuation of application Ser. No. 08/736,882, filed Oct. 25, 1996 now abandoned.

BACKGROUND OF THE INVENTION

This application relates to a method for evaluating data received from scanning a circular bar code label.

Bar code labels are utilized in a variety of applications to provide numerical identification, typically about an item carrying the label. A bar code consists of a series of alternate spaces, or light elements, and bars, or dark elements, with the light and dark elements being comprised of a series of wide and narrow elements. In the past, these elements have been positioned extending along a linear direction. A start code pattern is embedded at one end of the bar code label comprised of a known series of elements, and a stop code pattern is formed at the other end. Further, a wide "quiet zone" is formed at each end of the bar code label. The quiet zones and the start/stop patterns allow the scanner system to determine the starting and ending points of the label, and determine when to begin to evaluate the information read from the label and when to stop.

While bar code labels enjoy great success and wide application, certain deficiencies exist in their use. First, the analog readings from a bar code scanner are not constant, even during a single scanning of a single bar code label. Many variables affect the analog signal from the bar code scanner. Thus the analog signal for several dark elements, as an example, within a single scan of a bar code may have widely varying peak values. The signal level can vary from element to element as the contrast on the label changes, or as the angle of the back scattering from the label varies.

The above variation presents a problem when converting the analog information into digital information. This conversion requires a precise determination of the width of the code elements which are made up of bars and spaces. To make this determination, the system must identify the transitions between the dark and light elements, and switch the digital signal when a transition occurs. Typically, a reference voltage is set to identify a transition. Because of the above described variation, however, a fixed threshold or an averaging variable threshold circuit has not been found to be reliable to identify the transitions. Neither type circuit can track nor predict the amplitude of the next transition to be switched between the dark and light elements, or vice versa.

Further, while linear bar code labels provide a very efficient method of reporting data relative to a member which carries the label, they have certain limitations in that they require a relatively large amount of space. Certain applications do not have sufficient space, and thus have not been able to successfully use bar code technology. As an example, small circular elements such as medical test tubes, and sample vials have not been readily adapted to the use of linear bar code labels. Moreover, when a linear bar code label is placed on a curved structure, such as a test tube, other problems are presented in that the starting point for the label, and its relative position to a reader, must be carefully controlled to provide accurate results from the scanning of that label. The label must be positioned such that the beam passes through each element on the label, and this has been difficult to achieve with a linear label on a curved surface.

SUMMARY OF THE INVENTION

The present invention includes a method of evaluating data from a circular bar code label. The use of a circular bar code label provides maximum utilization of the space taken by the label, and is particularly valuable when used on small circular or curved elements such as test tubes. The circular bar code of the invention carries about three times the information that a linear, conventional bar code label could carry per unit of length. Moreover, since the circular bar code label is continuous, one need not worry about properly aligning the scanner with a starting point for the label before beginning scanning. Rather, since the code is circular and continuous, the system for evaluating the data from the scanner will eventually cross and recognize the starting point of the code on the label.

In a disclosed feature of this invention, several methods for evaluating data from scanning a circular bar code label includes the step of comparing a particular element to adjacent elements to determine whether the particular element is a wide or narrow element. The label is scanned continuously, and an analog signal is generated. That analog signal is then converted into a digital signal comprising a series of low and high logic levels corresponding to dark or light elements. By comparing the arrangement of a sequence of code elements that constitute a character, to a known key, a determination can be made as to the information carried on the particular bar code label.

The disclosed circular bar code includes a series of wedge-shaped narrow and wide elements. With such wedge-shaped elements, should the scanner be offset from the center of the circular bar code label, it is possible that a misreading could occur since width of the elements change as the radial distance from the center of the circular bar code label changes. Radially inner portions of the elements are relatively small when compared to the radially outer portions. It is possible that a wide element, read at its radially inner position, could be mistaken for a narrow element. Similarly, it is possible that a narrow element could be read near a radially outer position and be mistaken for a wide element. Mistaken identification could result in a misidentification of the information on the bar code label.

Applicant has determined that the width of adjacent elements of identical logical dimension do not vary significantly, even when the bar code reader is grossly offset relative to the center of the circular bar code label. Thus, the inventive methods compare an element under consideration to adjacent elements, and reach a determination of whether the element is narrow or wide based upon that comparison.

In a first method, each of the code elements for a given number is compared to an adjacent element, and a ratio is determined of those elements. As an example, if the widths of five code elements for a given numeral are A, B, C, D, and E, then ratios A/B, B/C, C/D, and D/E are determined. Each numeral identified by those five symbols has a unique set of four ratios. Thus, by determining these ratios, and comparing them to a "look-up" table or key, one can determine what numeral is identified by the four ratios. Since each element is compared to an adjacent element, problems with regard to misalignment of the scanner are eliminated.

In a second method embodiment, sets of elements make up a code for each of the numerals 0–9. The method includes the step of averaging the measured width of all dark or light elements for each numeral. Since this is a local average, the elements would all be adjacent to each other in the code, and thus variation due to offset will not be significant. The measured widths of each of the elements are then compared to their respective averages. If an element under consideration is greater than the average, then a determination is made that the element is a wide element. If the width is less than the average, a determination is made that the element is narrow. This sequence of calculation is done for each numeral of the code. Once the system has determined the arrangement of wide and narrow elements, it is relatively simple to compare that arrangement to a standard key and determine the information on the bar code label.

In a third method embodiment, a memory stores a previously read element, and also stores whether that previous element is a wide or narrow element. An initial storage "previous" element may be found from a standard signal found at the start code pattern of the label. As an example, the system may know that the pattern includes two successive narrow elements. The system may then store those initial elements into its memory as the "previous element" when beginning to make determinations on subsequent elements. Each subsequent element is compared to an element in storage. Should the width of the element under consideration differ greatly from the previous elements, a determination is made that the element under consideration is different than the previously stored element. On the other hand, if the width is found to be approximately equal to that of the element in storage, a determination can be made that the two are the same. That is, if the element in storage is known to be narrow, and the element under consideration is of a width that approximates that of the previous element, a determination can be made that the element under consideration is also narrow. On the other hand, if the element under consideration is of a width that is quite different than the element in storage, then a determination can be made that the two elements are different. If the element in storage is narrow, and the element under consideration is found to be of a much greater width than the element in storage, a determination can be made that the element under consideration is a wide element. Similarly, if an element is found to be of a width much less than a previous element that is known to be a wide element, it will be safe to assume that the element under consideration is a narrow element.

In the third method described above, the initial "previous" element may be re-established for each new group of code elements that are examined and which form a single character. This may be done by finding the narrowest code element within that group which becomes the "previous" element of that group. Each numeral includes at least one narrow element, and thus it is safe to assume that the "narrowest" element is a narrow code element. All the code elements of that group, which together constitute a single numeral or character can then be identified and the numeral can be decoded. This process continues by re-establishing the initial "previous" element and then analyzing the code elements of the next character of the bar code label, until all the numerals of the label have been identified.

Another variation of the above method is to evaluate and find the narrowest code element and the widest code element within the code pattern of a single character and store them both as the previous elements. All the other code elements, within that particular character, are then evaluated with respect to the narrow element and then with respect to the wide element. All of these methods should provide identical results.

A difference factor of about three is typically formed between the narrow and wide elements. Thus, in one example, a factor of 1.5 or as much as 2.0 may be utilized to determine whether the width of an element under consideration is sufficiently different than the stored element, such that a determination can be made that the elements are different. The exact factors used can vary and form no portion of this invention.

In a second aspect of this invention, the analog signal from the scanner is converted to a digital signal by a unique method of determining when a transition between light and dark elements occurs. As explained above, there is no standard signal strength for either the dark or light elements. This presents a problem in determining when to switch the digital signal between the dark and light elements. Applicant addresses this problem by splitting the time derivative of the analog signal into two channels, or branches, and delaying one of those branches. The second branch is sent to a circuit which determines the proper switching threshold of the delayed analog signal. A threshold signal which is proportional to the peak value is generated and compared to the delayed signal. When the delayed signal crosses the proportional signal by an infinitesimal quantity, a switching occurs from analog to digital. The invention is based on the operation of a proportional threshold circuit which produces a threshold level for switching the approaching delayed signal at a value that is preferably very close to the midpoint of the delayed signal. This aspect of the invention has applications not only in circular bar code labels, but also in linear bar code labels.

These and other features of the present invention may be best understood from the following specification and drawings, of which the following is a brief description.

DETAILED DESCRIPTION OF PREFERRED EMBODIMENTS

Figure 1:
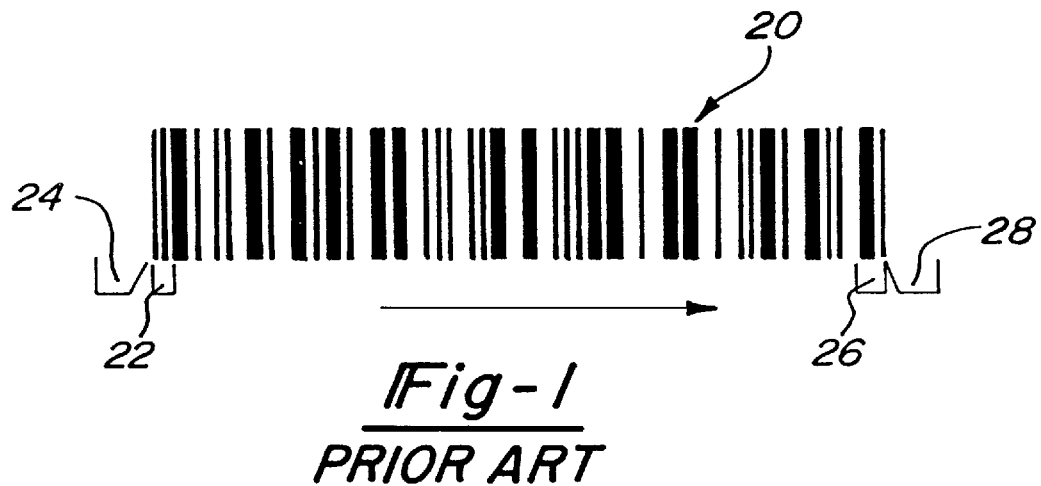
FIG. 1 is a view of a prior art linear bar code label.

FIG. 1 shows a liner bar code label 20 which includes a start code pattern 22, positioned adjacent to a quiet zone 24. At the opposite end of label 20 is a stop pattern 26, and a quiet zone 28. A system for scanning the bar code label 20

"knows" that after the quiet zone 24, the start of code 22 occurs. The system recognizes that the start of code comprises a known pattern such as the illustrated two spaced narrow dark elements and two narrow light elements. Following the start of code, the system recognizes that the subsequent series of dark or light, wide and narrow elements provide a code that represents particular numerals. Typically, the dark elements represent a first numeral, while the light elements represent a second numeral. The system analyzes the arrangement of the narrow and wide elements to determine the numerals embodied in the bar code label. As stated above, while linear bar code labels have achieved wide acceptance, in some applications they have not been practically utilized since they require more space than may be available.

Figure 2:
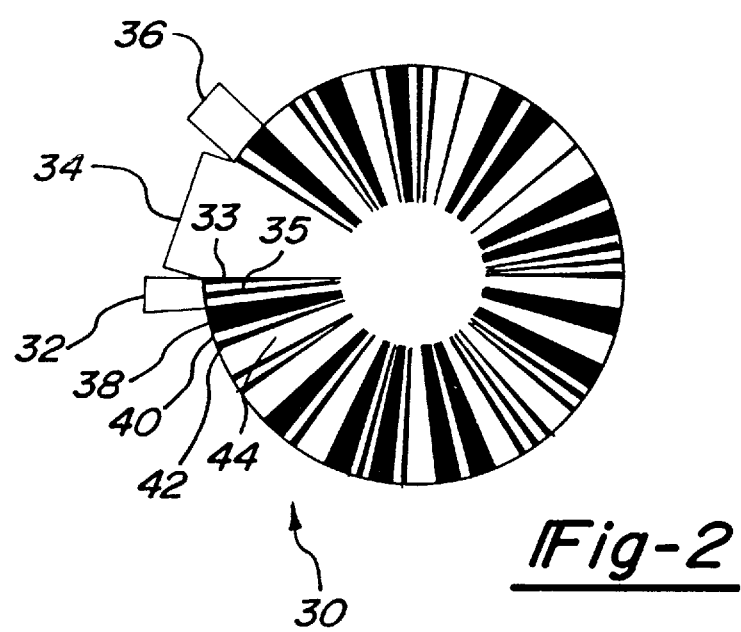
FIG. 2 is a view of a circular bar code label according to the present invention.

FIG. 2 shows a circular bar code label 30. The circular bar code label 30, in this example, includes a start code pattern 32 incorporating two narrow dark elements 33 and two narrow light elements 35. A quiet zone 34 is located between start code 32 and a stop code pattern 36. Should reading of the circular bar code label 30 begin at a position other than the start code 32, the system will disregard these code elements and will start to acquire data after the quiet zone 34 is passed. The quiet zone 34 is typically on the order of 10 times the width of a narrow element. This relatively large size insures that no matter how far offset the reader may be, the system will recognize the quiet zone 34.

As shown in circular bar code label 30 there are wide dark elements, such as 38, and narrow dark elements, such as 42. Similarly, there are narrow light elements 40 and wide light elements 44. By arranging the order of the narrow and wide elements, the bar code label carries encoded information. As an example, a numerical code on the bar code label 30 could identify information about a particular patient associated with a test tube that may carry the bar code label 30.

In one standard type of bar code, a first numeral is encoded by a particular order of five dark elements and a second numeral of five light elements. It is the arrangement of the narrow and wide elements that represent encoded data in a bar code label and which is decoded by a bar code reader. Other types of bar code symbologies are known, and this invention is not limited to any particular type of bar code symbology.

Figure 3:
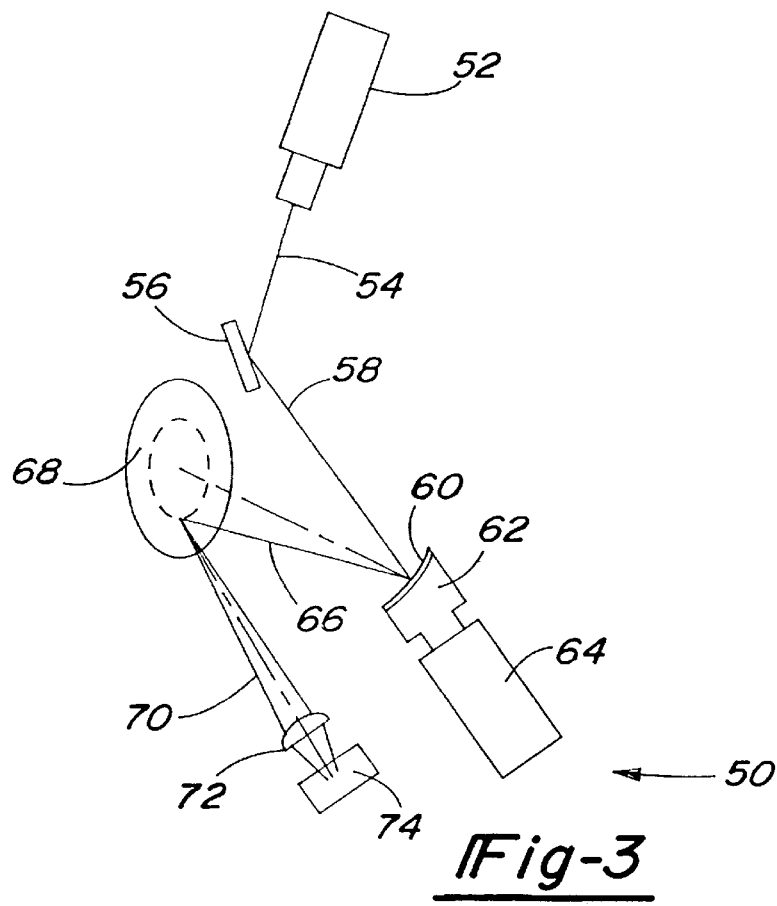
FIG. 3 is a view of a system for reading a circular bar code label.

A system 50 for reading a bar code label is illustrated in FIG. 3. As shown, a laser source 52 directs a collimated beam 54 at a mirror 56. Mirror 56 deflects the beam, as shown at 58, towards a circular concave mirror 60. Mirror 60 is connected to an eccentric adaptor 62 which is driven by a rotary motor 64. Rotary motor 64 is controlled to rotate adaptor 62, and hence mirror 60. This rotation causes scanning beam 66 to generate a circular scanning beam on circular bar code label 68. A back scattered modulated optical signal 70 is directed off the bar code label 68 and focused by a lens 72 onto a photodetector 74. Photodetector 74 outputs an analog current signal that is proportional to the optical modulated signal to a system as will be described below.

Although the above-described bar code reading system 50 is the preferred system, it is also anticipated that one might rotate the bar code label 68, and the element which carries the label, and maintain the scanning beam 66 fixed. In a further envisioned embodiment, a charged-coupled device (a CCD camera) may be utilized to take a "snapshot" of the bar code label 68 for evaluation. The CCD camera may be of the matrix camera type or may be of the one-dimensional circular array type. The technology to perform such a method is well known to those skilled in the respective arts.

Figure 4:
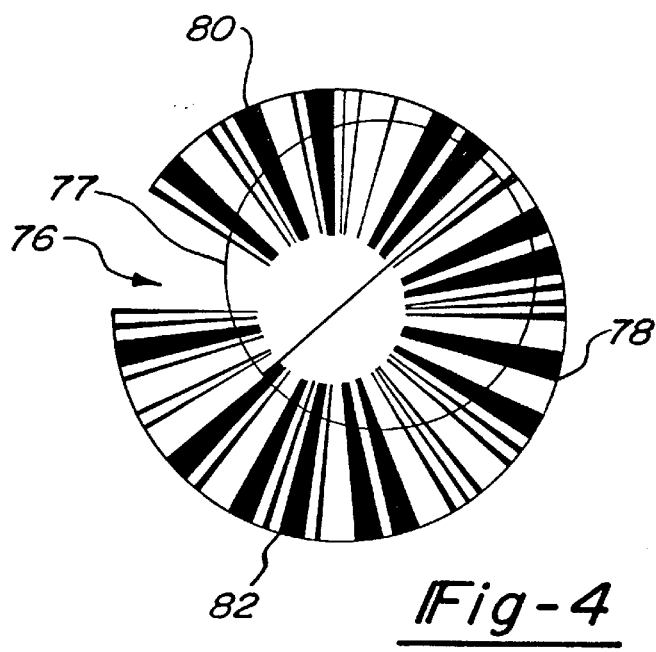
FIG. 4 shows a circular bar code reader with an offset scanning beam.

When scanning a circular bar code, the possibility exists that the scanning beam is offset from a center of the bar code label. As shown in FIG. 4, a bar code label 76 is being scanned by a scanning beam 77 which is offset from center 78 of bar code label 76. As can be seen, at the point where the scanning beam 77 crosses wide dark element 80, element 80 has a greater width than the width for a second wide dark element 82 at the point at which the scanning beam 77 crosses second element 82. The system evaluating the analog signal from the scanning of label 76 must recognize both elements 80 and 82 as being wide elements, despite the difference in measured widths. For this reason, it is possible that errors may occur when the reader is offset relative to the label.

The potential extent of this problem will be shown by the following analysis. The measured width of a wedge-shaped element as an offset scanning beam transverses an angular distance of 180° can be approximated by the formula:

$$W=[R_1+(R_2-R_1)\beta/180][(\pi/180)\theta]$$

Wherein:
W the width of the code element;
$R_1$=the minimum radius of the scanning beam with respect to the center of the label;
$R_2$=the maximum radius of the scanning beam with respect to the center of the label;
$\beta$=the angular position where the width of the code element is being calculated (0<=$\beta$=<180 degrees); and
$\theta$=the dimension of a wedge expressed in degrees (which will vary between the element being a narrow or a wide code element).

In order to show the potential detrimental effect of an offset scanning beam, applicant has calculated the narrow and wide wedges over 180 degrees when $R_1$=0.26 inches, $R_2$=0.52 inches, $\theta$=2.5° for a narrow bar and 7 degrees for a wide bar, and wherein $\beta$ is is incremented in steps of 7 degrees. Table 1 shows the calculated values using this formula.

From Table 1, it can be seen that the difference in measured width of the scanned narrow wedges with an offset scanning beam between the minimum to maximum radius (i.e., a narrow wedge at 0 degrees and a narrow wedge at 180 degrees) is 100%. A similar result occurs for wide wedges. This difference could result in a misidentification of a narrow or wide element when evaluating the data from a scanned circular bar code. However, from Table 1, it can be seen that the maximum change in width for adjacent elements is less than 4%. This small variation in the measured widths is utilized by the present invention to assure the integrity of the determination of whether a particular element is a wide or narrow element, even with gross misalignment of the scanning device. A method for utilizing this phenomenon to correct for misalignment of the reader will be disclosed below with reference to FIGS. 7–9.

TABLE 1

| DEGREES ($\beta$) | NARROW WEDGE | WIDE WEDGE | PERCENT CHANGE OF ADJACENT WEDGES OF IDENTICAL WIDTH |
|---|---|---|---|
| 0 | .0113 | .0327 | |
| 7 | .0118 | .0339 | 3.89 |
| 14 | .0122 | .0352 | 3.74 |
| 21 | .0127 | .0365 | 3.61 |
| 28 | .0131 | .0378 | 3.48 |

TABLE 1-continued

| DEGREES (β) | NARROW WEDGE | WIDE WEDGE | PERCENT CHANGE OF ADJACENT WEDGES OF IDENTICAL WIDTH |
|---|---|---|---|
| 35 | .0136 | .0390 | 3.37 |
| 42 | .0140 | .0403 | 3.26 |
| 49 | .0144 | .0416 | 3.15 |
| 49 | .0149 | .0428 | 3.06 |
| 63 | .0153 | .0441 | 2.97 |
| 70 | .0158 | .0454 | 2.88 |
| 77 | .0162 | .0466 | 2.80 |
| 84 | .0166 | .0479 | 3.72 |
| 91 | .0171 | .0492 | 2.65 |
| 98 | .0175 | .0505 | 2.58 |
| 105 | .0180 | .0517 | 2.52 |
| 112 | .0184 | .0530 | 2.46 |
| 119 | .0188 | .0543 | 2.40 |
| 126 | .0193 | .0555 | 2.34 |
| 133 | .0197 | .0568 | 2.29 |
| 140 | .0202 | .0581 | 2.24 |
| 147 | .0206 | .0594 | 2.19 |
| 154 | .0211 | .0606 | 2.14 |
| 161 | .0215 | .0619 | 2.10 |
| 168 | .0219 | .0632 | 2.05 |
| 175 | .0224 | .0644 | 2.01 |
| 180 | .0228 | .0657 | 1.97 |

Figure 5:
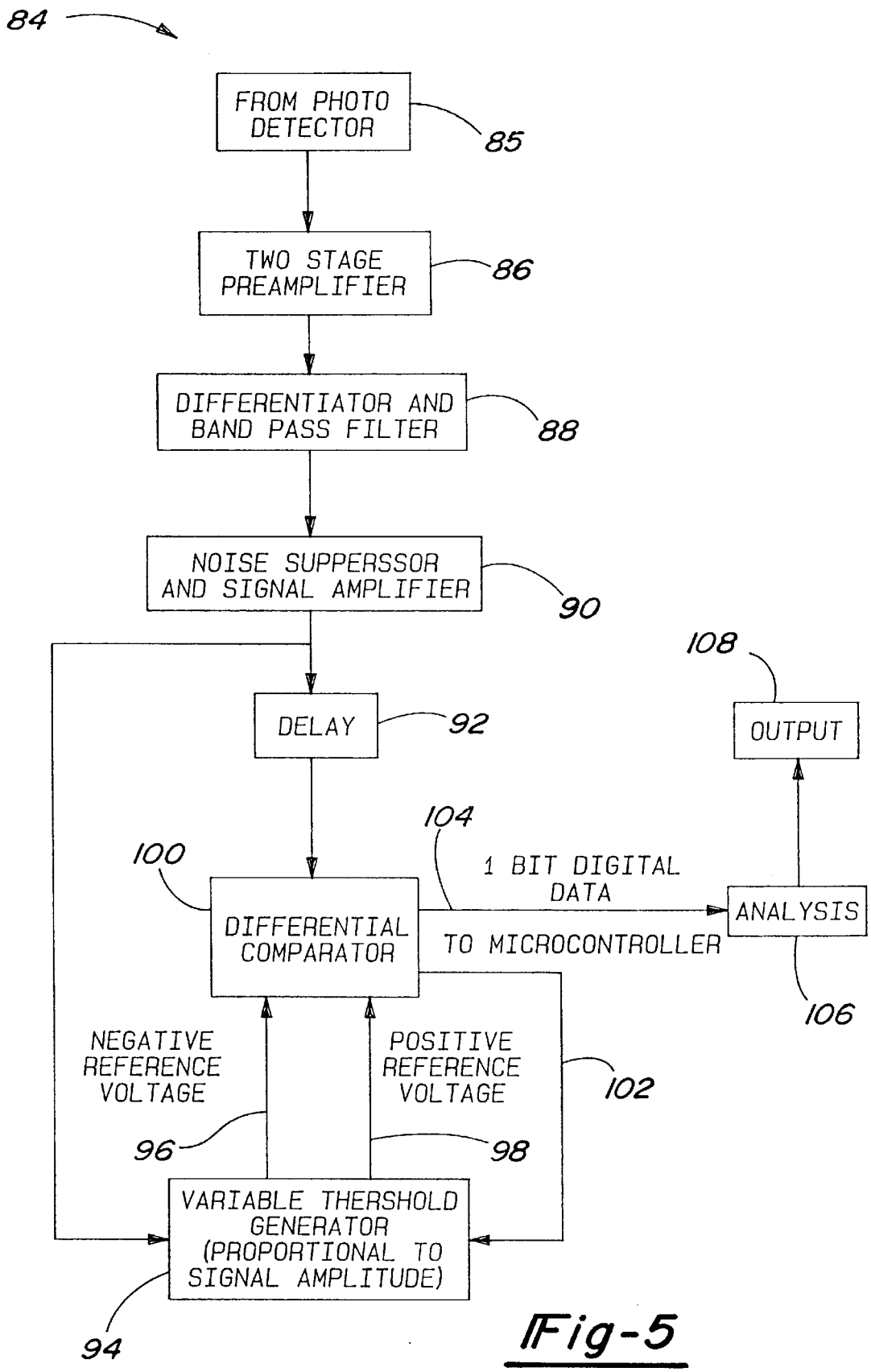
FIG. 5 is a schematic of an analog to digital conversion circuit.
Figure 6A:
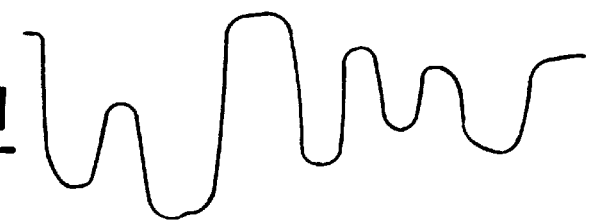
FIG. 6A shows the analog signal at an initial location in the circuit of FIG. 5.

A system 84 for converting the analog signal from the photodetector to a digital signal is disclosed in FIG. 5. The conversion will be explained with reference to FIG. 5 and FIGS. 6A–6G. One should appreciate that the signals shown in FIGS. 6A–6G are representations of one potential set of values. The signals will vary with the signal read from the bar code label, and with the elements as encoded on the bar code label. An analog signal from photodetector 85 is sent to a two-stage preamplifier 86. The signal at that point may resemble the signal as shown in FIG. 6A. High peaks are associated with the spaces or light elements, whereas the low valleys correspond to the bars or dark elements. It is typical that the magnitude of these peaks and valleys varies, as is shown in FIG. 6A. The signal from the preamplifier 86 then passes to a differentiator and band pass filter 88, which is frequency selective such that the output of element 88 resembles the signal shown in FIG. 6B. Element 88 produces the time derivative of the original signal. Note that the differentiator has enhanced and defined the edges of the transitions between the light and dark elements.

Figure 6B:
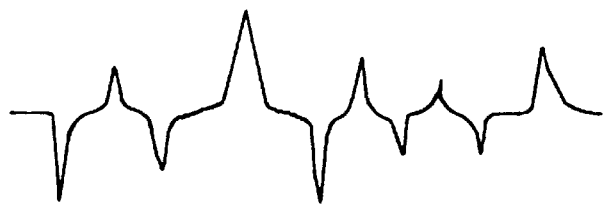
FIG. 6B shows the analog signal at a subsequent point in the circuit of FIG. 5.
Figure 6C:
FIG. 6C shows the analog signal at yet another subsequent point in the circuit of FIG. 5.
Figure 6D:
FIG. 6D shows the analog signal at yet another subsequent time in the circuit of FIG. 5.
Figure 6E:
FIG. 6E shows a portion of the analog signal at another subsequent point in the circuit of FIG. 5.
Figure 6F:
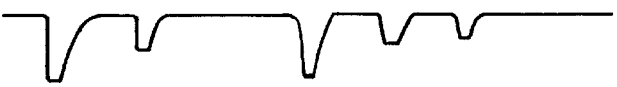
FIG. 6F shows a second portion of the analog signal at another subsequent point in the circuit of FIG. 5.
Figure 6G:
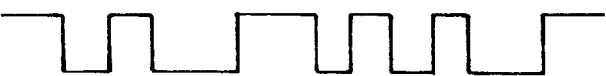
FIG. 6G shows the digital signal provided by the circuit of FIG. 5.

The signal generated by differentiator 88, and shown in FIG. 6B, then passes to a noise suppressor and signal amplifier 90. The signal leaving element 90 may resemble the wave form as shown in FIG. 6C. Element 90 blocks low level noise, and provides signal gain.

From element 90, the analog signal is split into two channels or branches. A first branch passes to a delay element 92 and a second branch is directed to a variable threshold generator 94, producing a signal that is proportional to the delayed signal to be switched. Element 94 senses the full amplitude of the analog signal. Once a peak value is detected, a signal proportional to that peak value is generated. The element 94 represents a pair of dual switchable integrators, with one for negative transitions as found at the start of scanning a bar, and one for positive transitions as found at the start of scanning a space. The proportional signal produces a switching threshold that is preferably a fraction of the delayed signal, and most preferably one half the peak value. The proportional signal would then also approximate the midpoint of the incoming delayed signal. If the local analog signal at a particular point in time is a negative signal, as would be the case when a transition to a dark element is being read, the proportional signal is sent through negative line 96 to a differential comparator 100. This is the signal shown at FIG. 6F. If, on the other hand, the signal is a positive signal, as would be the case when a transition to a light element is being read, the signal would be sent through positive line 98 to the differential comparator 100. This is the signal shown in FIG. 6E. The analog signal from the delay 92 is then compared to the threshold signal from lines 96 or 98. When the delayed signal 92 crosses the threshold signal by an infinitesimal value, a determination is made that the analog signal from delay 92 has changed between a light or dark element. That is, when a transition to a dark signal is at delay 92, the related negative dark threshold signal is sent through line 96 to the differential comparator. When the analog signal from delay 92 crosses the threshold signal by an infinitesimal value, the digital signal at 6G changes to a logic low, indicating a bar. When a transition to a light signal is found at delay 92 and that signal crosses by an infinitesimal value the threshold value found at line 98, the digital signal at 6G changes to a logic high, indicating a space. The output of comparator 100 is a 1-bit digital data indicating whether a dark or light element is being read. When the analog signal from delay 92 crosses the threshold values in lines 96 or 98 by an infinitesimal value, the digital data being outputted by line 104 is switched. The length of delay is selected so that the appropriate timing is achieved and the threshold proportional signal is compared to its original associated delayed signal.

A preset line 102 is connected from comparator 100 to element 94. Each time an analog to digital conversion occurs, one of the threshold signals in element 94 is preset such that the threshold voltage is erased from element 94. Thus, the voltage level at element 94 is continuously being preset, after each switching operation to a default value such that the next local light or dark signal is evaluated on its own, without any relationship to prior light or dark signals.

It should be understood that a 1-bit digital data at 104 represents dark and light elements. In this example, a dark element is represented by a logic low while a light element is represented by a logic high. The time interval the signal is low is proportional to the width of a dark element, and the time interval a signal is high is proportional to the width of a light element. The width of the code elements are represented as counts in 106. Each code element acquires a count proportional to its width.

In a conventional bar code system the width of the dark and light code elements can only change according to the logic of the encoded pattern of a particular character. However, in circular bar codes as described in this invention, the width of the wedge-shaped code elements is also a function of the radius. This does not constitute any problem as long as the scanning of the optics is concentric with the bar code label: i.e., all the bars and spaces are intercepted at their relative proper logical dimension. If, on the other hand, the scanning is eccentric with respect to the center of the label, then the absolute logical dimensions of the bar/spaces of the code along the scanning path can become non-uniform; and this may have an adverse effect on the decoding of the characters.

In order to overcome this problem a ratiometric method for analyzing the elements of the code which make up the characters is disclosed. This method provides an optimum reading rate in spite of any measure of eccentricity, as long as all the elements of the code are intercepted by the scanning beam.

The ratiometric method, as described below, is used to decode numerals from the code elements (bars and spaces).

In this method the relative width of all code elements are stored in memory. After the program identifies the start/stop elements, the characters of the code can be identified and analyzed. Generally, in a bar code label each character has a fixed number of code elements. For example, interleaved 2 out of 5 symbology has five bars or spaces per digit. Each digit of the code can be found by evaluating the ratio of the code elements (bars and spaces). As an example, assume that the letters A, B, C, D, E represent the width of the code elements that make up a numeral of the code. Then, by calculating the ratios: A/B, B/C, C/D and D/E (4 ratios) the digit encoded in these code elements can be found. Further, each of the ratios is determined by comparing "adjacent" elements, thus decreasing the effect of any misreading from an offset scanner.

This can be done since the ratio pattern for each digit is unique so that the numeral that is represented by a given ratio pattern can be retrieved by means of a "look-up" table or key. The thresholds for determining the limits between the three possible ratios, for this example, are given by illustration as follows: if one of the ratios as described above is greater than 1.7, then it will be recognized as a ratio of a wide element divided by a narrow element. If the ratio found is smaller than 0.6, then it will be recognized as a ratio of a narrow element divided by a wide element. If the ratio found is between 0.6 and 1.7, this indicates that the code elements are of identical width. The limits or thresholds where a differentiation is made between the ratios can be other than those given in this example and limits are not part of this invention.

Figure 7:
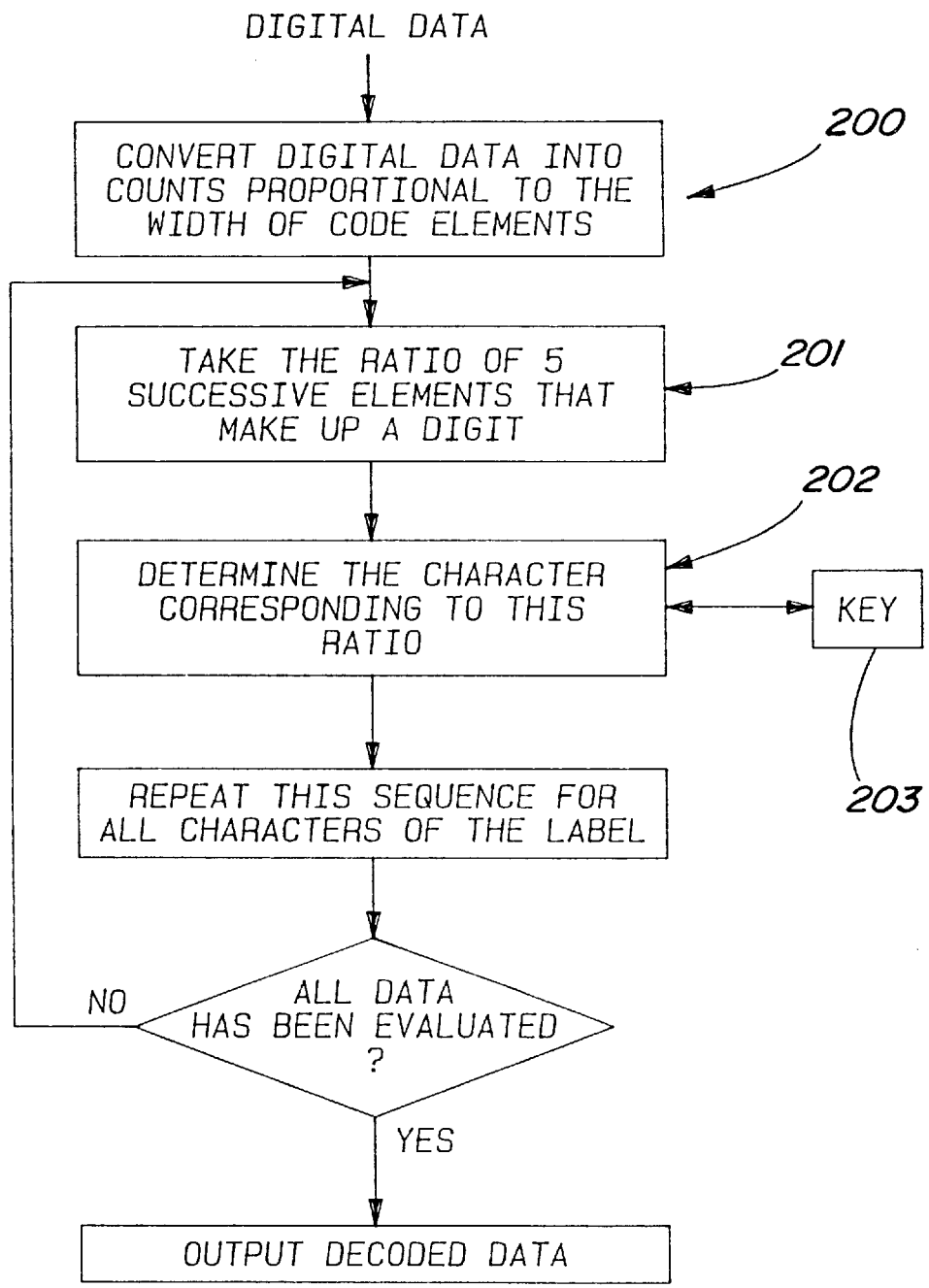
FIG. 7 shows a flow chart for a first embodiment method according to the present invention.

Referring to the flow chart shown in FIG. 7, the digital data is converted to a count proportional to the width of the code elements in 200. Then the ratios of 5 successive bar or space elements are evaluated in 201. This evaluation involves the calculation of 4 ratios as shown in 202. Each group of ratios is converted to a numeral by means of a look up table as shown in 203. This sequence is repeated for all the characters of a bar code label.

This method of decoding of digits assures that the barcode reader will properly decode the characters of the code in spite of any gross offset of the scanning beam with respect to the center of the barcode label.

Figure 8:
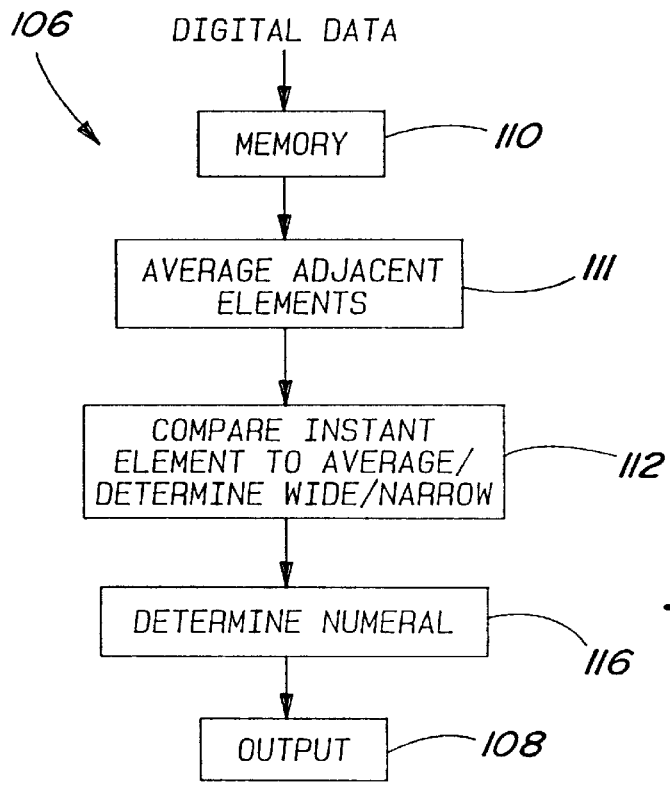
FIG. 8 shows a flow chart for a second embodiment method according to the present invention.
Figure 9:
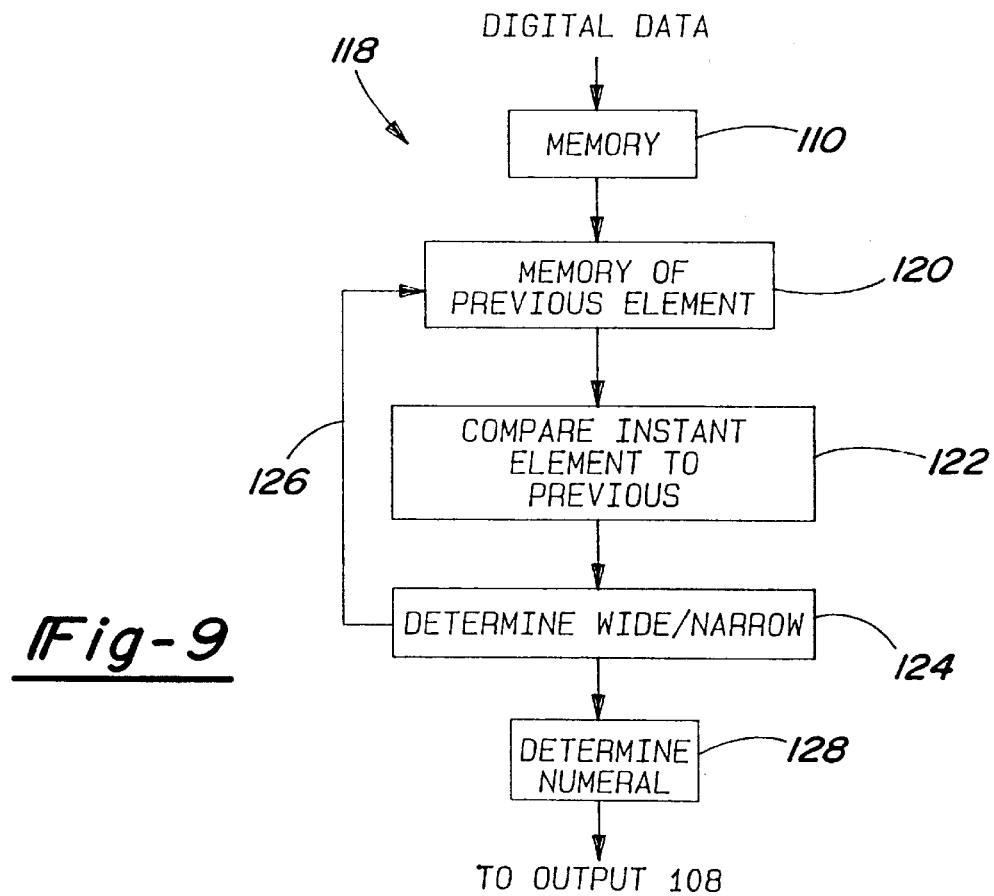
FIG. 9 shows a flow chart for third embodiment method according to the present invention.

Other methods for evaluating data from a circular bar code label are shown in FIGS. 8 and 9. Preferably all evaluations are done in the software domain. A second embodiment method 106 shown in FIG. 8 includes storing the width of the code elements as counts in a memory 110. An averaging of several adjacent elements, that constitute one character, is then performed at step 111. In one disclosed embodiment, the width of five adjacent dark elements are averaged or five adjacent light elements. The code elements make up one numeral. The averaging of five elements can be used, for example, to analyze a bar code symbology known as interleaved two out of five. In such a bar code symbology, a first numeral is identified by the relative width of five dark elements and a second numeral by five alternatively placed light elements. The arrangement of narrow and wide elements determines the particular numeral.

The next step is to compare the width of a particular code element (count) with the average value. If the value of the particular count being evaluated is greater than the average value, one can determine that the count represents a wide element. On the other hand, if the particular count of a code element is less than the average, one can determine that it is a narrow element. The comparison and determination of whether an element is a wide or narrow element is shown at step 112. Once the five elements have been evaluated, one can determine what numeral is represented by the particular bar code, as shown at step 116. Once the analysis of the entire numerical information found in the code is completed, the system then directs the determined information to output 108.

By developing an average of the adjacent elements, as shown at step 111, one eliminates the detrimental effect on the evaluation due to an offset scanning beam. As shown in Table 1, adjacent elements are relatively close in the scanned width, even given a gross misalignment of the scanning beam. Thus, the ratios of adjacent elements (FIG. 7) or averaging of five such elements (FIG. 8) eliminates detrimental effects, and results in proper reading.

A third embodiment method 118 is illustrated in FIG. 9. Again, counts proportional to the widths of code elements are stored into a memory 110. A memory 120 for a previous scanned element stores information about the width of the prior element, and also remembers whether the prior element was determined to be a wide or narrow element. The prior element is then compared to the current element to be tested. If the current element is found to be approximately of the same magnitude as the element stored in the memory 120, a determination is made at 124 that the element under consideration is the same as that in the memory 120. On the other hand, if the width of the element under consideration is grossly different than that stored at 120, a determination is made that the two elements are different. As an example, should the element stored in memory 120 have been determined to be a wide element, and should the element under consideration extend for a width that is less than half that of the element stored at 120, a determination can be made that the element under consideration is narrow. Alternatively, if the element stored in memory 120 is narrow, and the element under consideration is two to three times as large as the element stored in memory 120, a determination can be made that the element under consideration at step 124 is wide. The relative widths of the wide and narrow elements are typically on the order of three to one. Thus, step 124 can "look" for differences on the order of two or 0.5, to determine that an element under consideration is different than that in storage. As shown from Table 1, such a gross margin of error is not necessary, and a smaller factor may be utilized. The exact factors form no part of this invention.

Once a determination is made as to the element under consideration at 124, a feedback signal 126 updates the element stored at 120. The initial prior element may be from the start code pattern, which are known to be narrow. Although the particular logic shown in FIG. 9 compares the previous element to the element under consideration, it should be understood that a subsequent element could be used, or a single element could be used for all elements in a particular number (i.e., five adjacent elements). Various modifications of this basic principle will be obvious to those of ordinary skill in this art.

In a further feature of this invention, the initial "previous" element may be determined by scanning a group of elements that constitute a given numeral. Each numeral includes at least one narrow element and at least one wide element. Thus, as an example, by identifying the narrowest element, one can assume that that element is a narrow element. That element can then be stored as the initial "previous" element, and that method can proceed as described. As a further variation on this method, both the narrowest and widest elements within a given numeral can be identified and used as the comparison element for each other element in that numeral.

Once the determination of a group of wide or narrow elements is completed, a determination is made as to the number represented by these code elements of the bar code label. An output is then directed to output 108, and may be displayed as mentioned previously.

The details of the logic and circuitry required for the circuitry of FIG. 5, and the method flow charts of FIGS. 7–9 are well within the ability of a worker in the art.

Preferred embodiments of the present invention have been disclosed, however, a worker of ordinary skill in the art would recognize that certain modifications would come within the scope of this invention. For that reason, the following claims should be studied in order to determine the true scope and content of this invention.

We claim:

1. A method of analyzing data from a bar code label comprising the steps of:
    a. reading a bar code element;
    b. splitting an analog signal derived from the reading of said bar code element into two branches, with a first branch being routed into a delay branch having a time delay dependent upon a switchable integrator, and a second branch being used to sense a full amplitude of said analog signal, detect a peak value, and generate a signal proportional to said peak value;
    c. comparing the signal proportional to said peak value to a delayed signal value from said delay branch, and switching an output between dark and light signals whenever said delayed signal value crosses the signal proportional to said peak value; and
    d. setting said proportional signal to a default value whenever said delayed signal value crosses the signal proportional to said peak value.

2. A method as recited in claim 1, wherein said proportional signal is a fraction of said peak value.

3. A method as recited in claim 2, wherein said proportional signal is approximately one-half said peak value.

4. A method as recited in claim 1, wherein said bar code label is a circular bar code label.

5. A method as recited in claim 1, herein said method further includes the steps of sending the output of step c. as digital data to a system which interprets said digital data, said system providing an output of the information scanned from said bar code label.

6. A method as recited in claim 1, wherein the analog signal which is split in step b. is derived by taking the time derivative of the original signal read from the bar code.

7. A circular bar code evaluation system comprising:
    a. means to scan a circular bar code label comprising a plurality of alternate dark and light type elements and generate an analog signal from the circular bar code label;
    b. means to transform the analog signal into a digital signal having digital logic levels comprising a series of one-bit data streams that provide a measure of the width of bars and spaces of the circular bar code label, said transforming means comprising:
        means for splitting the analog signal into two branches with a first branch being routed through a delay line that depends upon dual switchable integrators, and with a second branch detecting a peak value for the analog signal and integrating the slope of the analog signal for positive and negative transitions; and
        means for comparing the delayed signal of the first branch, following peak detection, to a signal proportional to the peak value to cause a change in the digital logic levels whenever the delayed signal crosses the proportional signal; and
    c. means to compare portions of the digital signal to adjacent or alternate elements in order to determine whether the particular bar code element being evaluated is a wide or narrow element.

8. A system as recited in claim 7, wherein said means to scan includes a rotating member directing a rotating beam along a circular bar code element.

* * * * *